(12) United States Patent
Mizue et al.

(10) Patent No.: US 6,250,527 B1
(45) Date of Patent: Jun. 26, 2001

(54) CUP HOLDER FOR A VEHICLE

(75) Inventors: Toshiyuki Mizue; Masaya Watanabe; Kazuomi Sakata, all of Kanagawa-ken (JP)

(73) Assignees: Nissan Motor Co., Ltd.; Nifco Inc., both of Yokohama (JP)

( * ) Notice: Subject to any disclaimer, the term of this patent is extended or adjusted under 35 U.S.C. 154(b) by 0 days.

(21) Appl. No.: 09/420,574

(22) Filed: Oct. 19, 1999

(30) Foreign Application Priority Data

Oct. 19, 1998 (JP) .................................................. 10-297197
Oct. 19, 1998 (JP) .................................................. 10-297203

(51) Int. Cl.$^7$ ...................................................... B60N 3/10
(52) U.S. Cl. ........................... 224/281; 224/539; 224/926; 248/311.2
(58) Field of Search ................................... 224/926, 281, 224/282, 539, 483; 248/311.2

(56) References Cited

U.S. PATENT DOCUMENTS

| | | | | |
|---|---|---|---|---|
| 4,919,381 | * | 4/1990 | Buist | 224/926 X |
| 5,474,272 | * | 12/1995 | Thompson et al. | 248/311.2 |
| 5,762,307 | * | 6/1998 | Patmore | 224/926 X |
| 5,791,616 | * | 8/1998 | Volkmann et al. | 224/926 X |
| 5,820,094 | * | 10/1998 | Tanaka | 224/926 X |
| 5,839,710 | * | 11/1998 | Hubbard | 224/926 X |
| 5,857,633 | * | 1/1999 | Pelchat, ll et al. | 224/926 X |
| 6,050,468 | * | 4/2000 | Kelley | 224/926 X |

FOREIGN PATENT DOCUMENTS

| | | |
|---|---|---|
| 6-115392 | 4/1994 | (JP) . |
| 8-132949 | 5/1996 | (JP) . |
| 9-220961 | 8/1997 | (JP) . |

\* cited by examiner

*Primary Examiner*—Gregory M. Vidovich
(74) *Attorney, Agent, or Firm*—McDermott, Will & Emery

(57) ABSTRACT

A cup holder has a case fixed to a conveyance, a tray for supporting the bottom of a container, and a pair of left and right holders. The case has an aperture open toward a passenger compartment. The tray is movably supported by the case, and can be pulled out from a storage position in the tray to a usage position, via the aperture. Each holder has an arm with a ring for supporting the side of the container. The arms are linked to the tray so as to be able to rotate horizontally. Each ring has an overlapping part that vertically overlaps with the other ring when the arms approach each other, and a non-overlapping part that does not overlap when the arms approach each other. The vertical-direction width of the overlapping parts is smaller than the width of the non-overlappng parts, thereby reducing the vertical-direction width of the case, making the holder suitable for installation in a conveyance having only limited usable space.

12 Claims, 8 Drawing Sheets

FIG.1
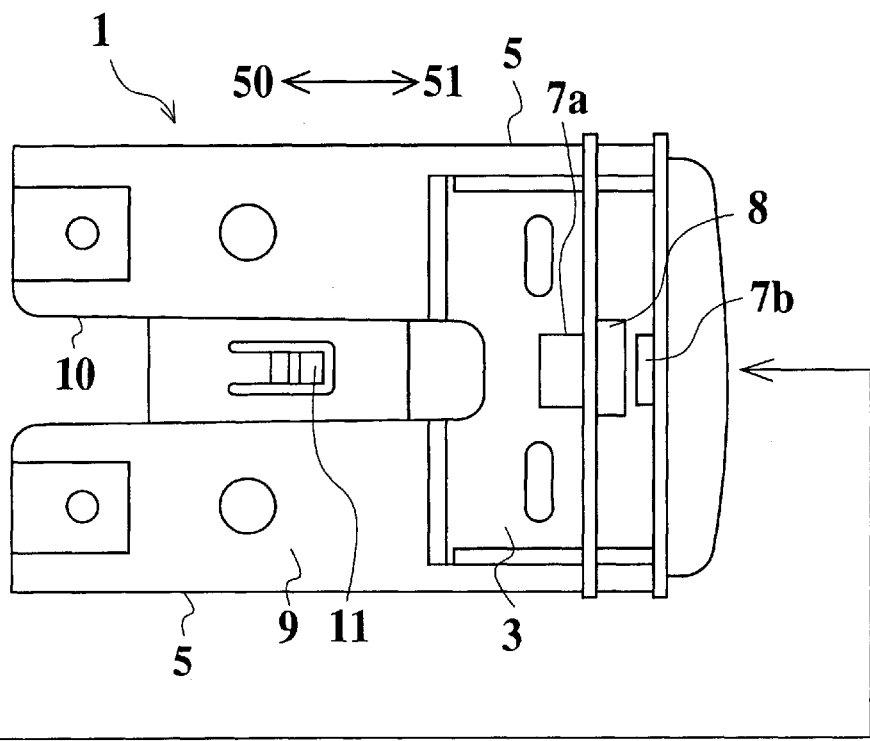
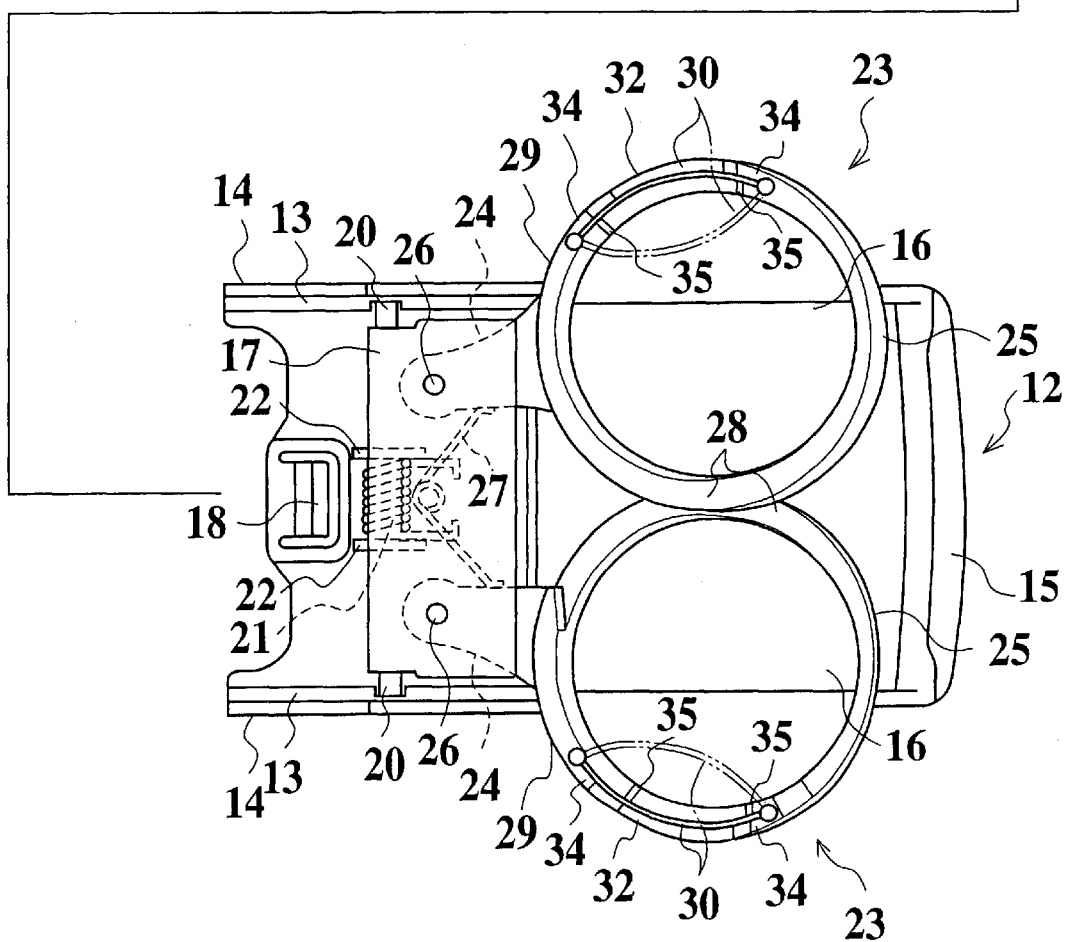

CUP HOLDER FOR A VEHICLE

The contents of Application No. TOKUGANHEI 10-297203 filed on Oct. 19, 1998 in Japan is hereby incorporated by reference.

BACKGROUND OF THE INVENTION

The present invention relates to a cup holder for use in a conveyance.

A cup holder for a conveyance in the past was, for example, provided for use by rear-seat passengers on the rear surface of a console box installed between the left and right front seats of a vehicle. (Refer to the Japanese laid-open patent application publication H6-115392 for similar technology.)

In a cup holder of the past, however, because the pair of left and right holders were merely housed within a case stacked vertically, the vertical width of the case was large, making it difficult to install the holders in a conveyance which provided only a limited amount of usable space.

Accordingly, it is an object of the present invention, in view of related art, to provide a cup holder for a conveyance that features small dimensions in the horizontal and vertical directions.

SUMMARY OF THE INVENTION

To achieve the above-noted object, a cup holder according to the present invention has a case that is fixed to a conveyance, a tray for supporting the bottom of a container, and a pair of holders on the left and right. The case has an aperture that opens facing the passenger compartment. The tray is movably supported by the case, and can be pulled out from its position housed within the case to the position in which it is used, via the aperture. Each holder has an arm with a ring for supporting the side of the container. The arms are linked to the tray so as to be rotatable in the horizontal direction. Each of the rings has an overlapping part, which overlaps vertically with an overlapping part of the other ring when the arms are brought into mutual proximity, and a non-overlapping part which does not overlap with the corresponding part of the other ring when the arms are brought into mutual proximity. The vertical-direction width of the overlapping parts is smaller than the vertical direction width of non-overlapping parts.

The term conveyance as used herein should be understood as a broad-ranging concept that encompasses such means of conveyance as motor vehicles, railroad cars, vessels, and aircraft. The expression "fixed to a conveyance" should be understood to include the case in which the case is fixed to the conveyance itself (that is, to a motor vehicle in the case of a motor vehicle) and also the case in which the case is fixed to an item assembled to the conveyance (such as a console box, instrument panel, or seat in the case of a motor vehicle). Additionally, the term container should be understood as a broad concept encompassing such containers as cans, bottles, and cups.

According to the above-noted configuration, because the vertical-direction width of the overlapping part of each ring is smaller than that of the non-overlapping part, when the rings are superimposed one over another, the overall vertical direction width thereof is smaller that the total of the width of the two non-overlapping parts. Therefore, the vertical-direction width of the case for housing the holders can be made small, the above-noted configuration being therefore suitable for use in conveyances that have only limited usable space.

BRIEF DESCRIPTION OF THE DRAWINGS

FIG. 1 is a plan view of the case and tray, shown separately, of an embodiment of the present invention.

DESCRIPTION OF THE PREFERRED EMBODIMENTS

Figure 2:
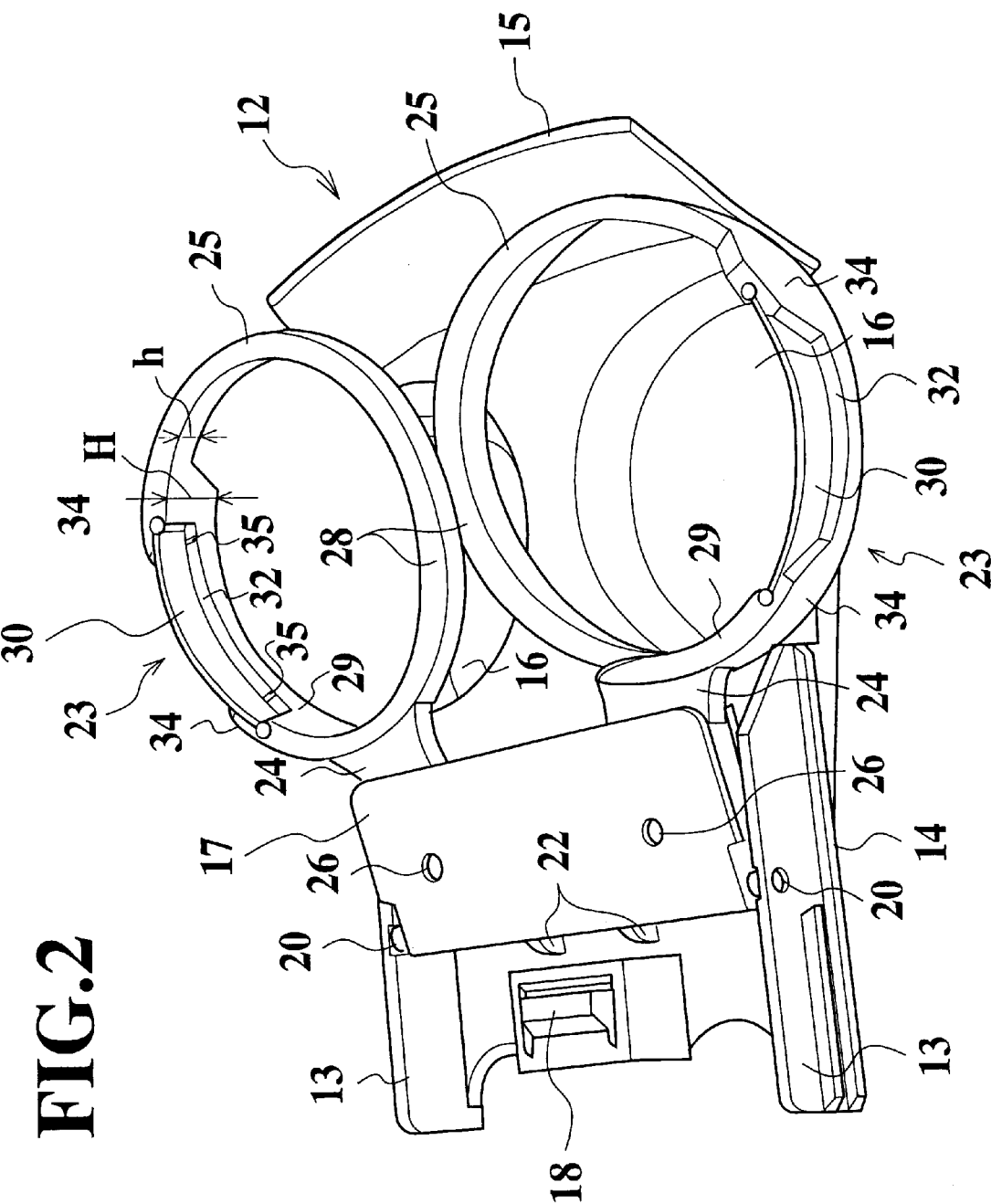
FIG. 2 is a perspective view showing the tray and holder.
Figure 3:
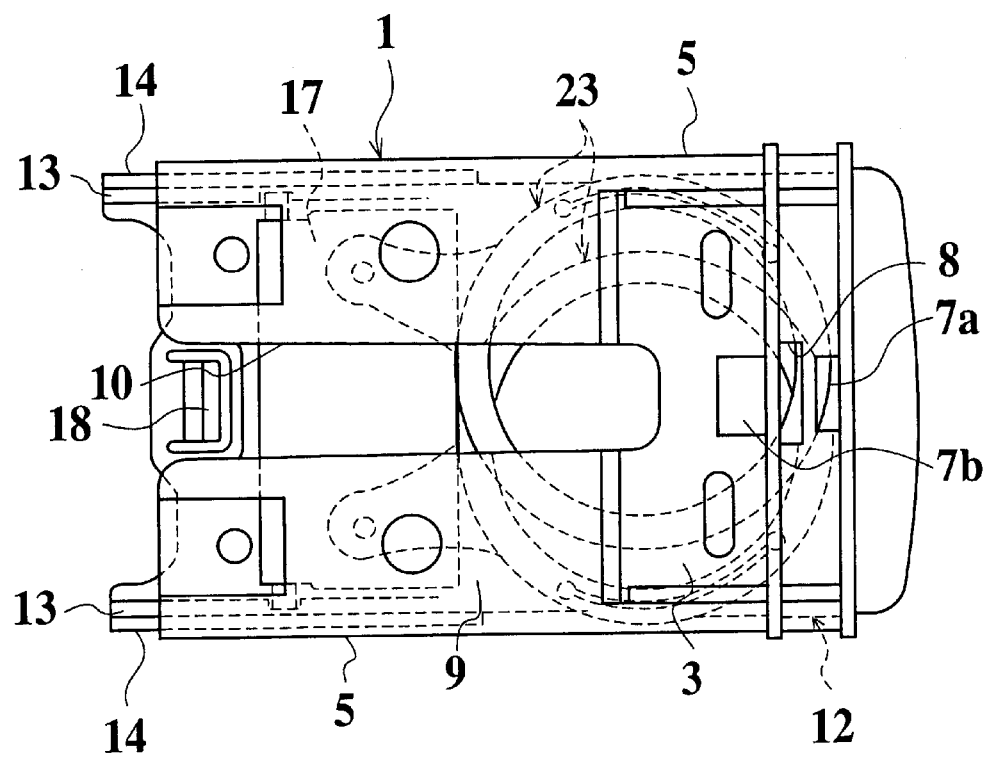
FIG. 3 is a plan view showing the tray housed within the case.
Figure 4:
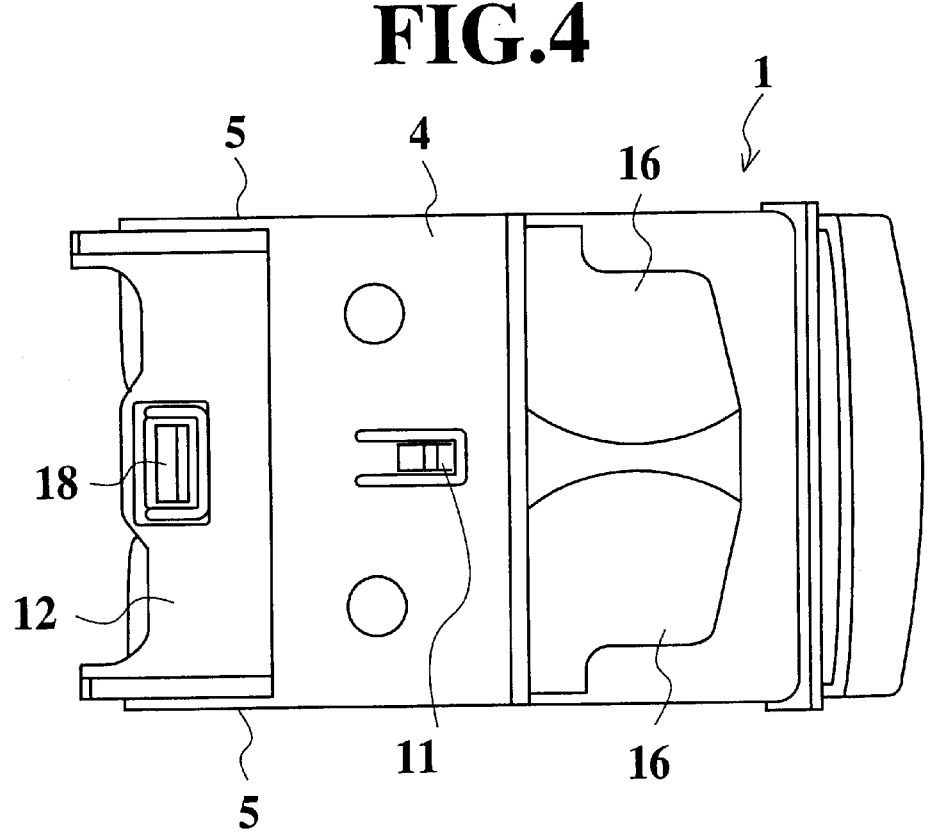
FIG. 4 is a bottom view showing the tray housed within the case.
Figure 5:
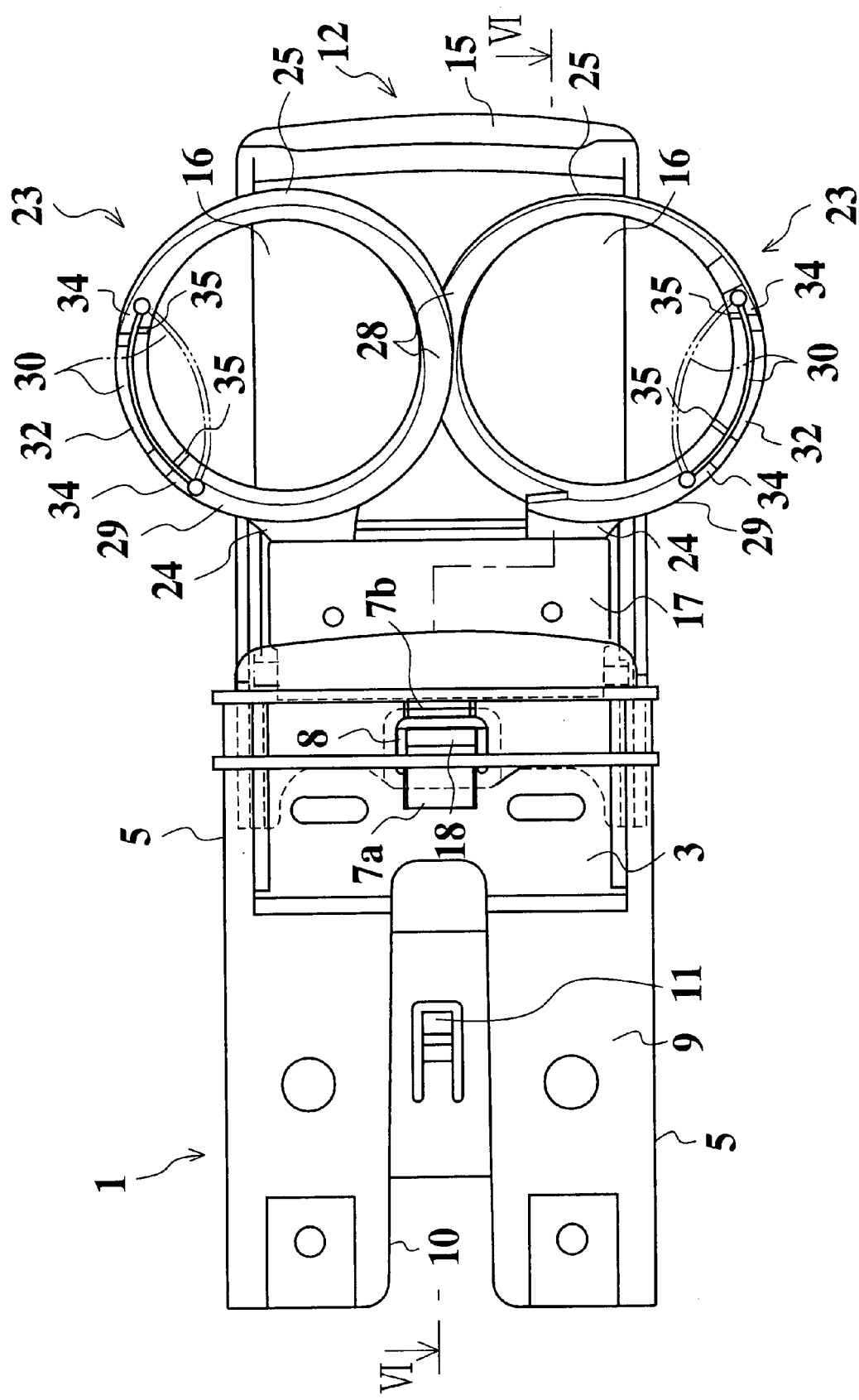
FIG. 5 is a plan view showing the tray pulled out from the case.
Figure 6:
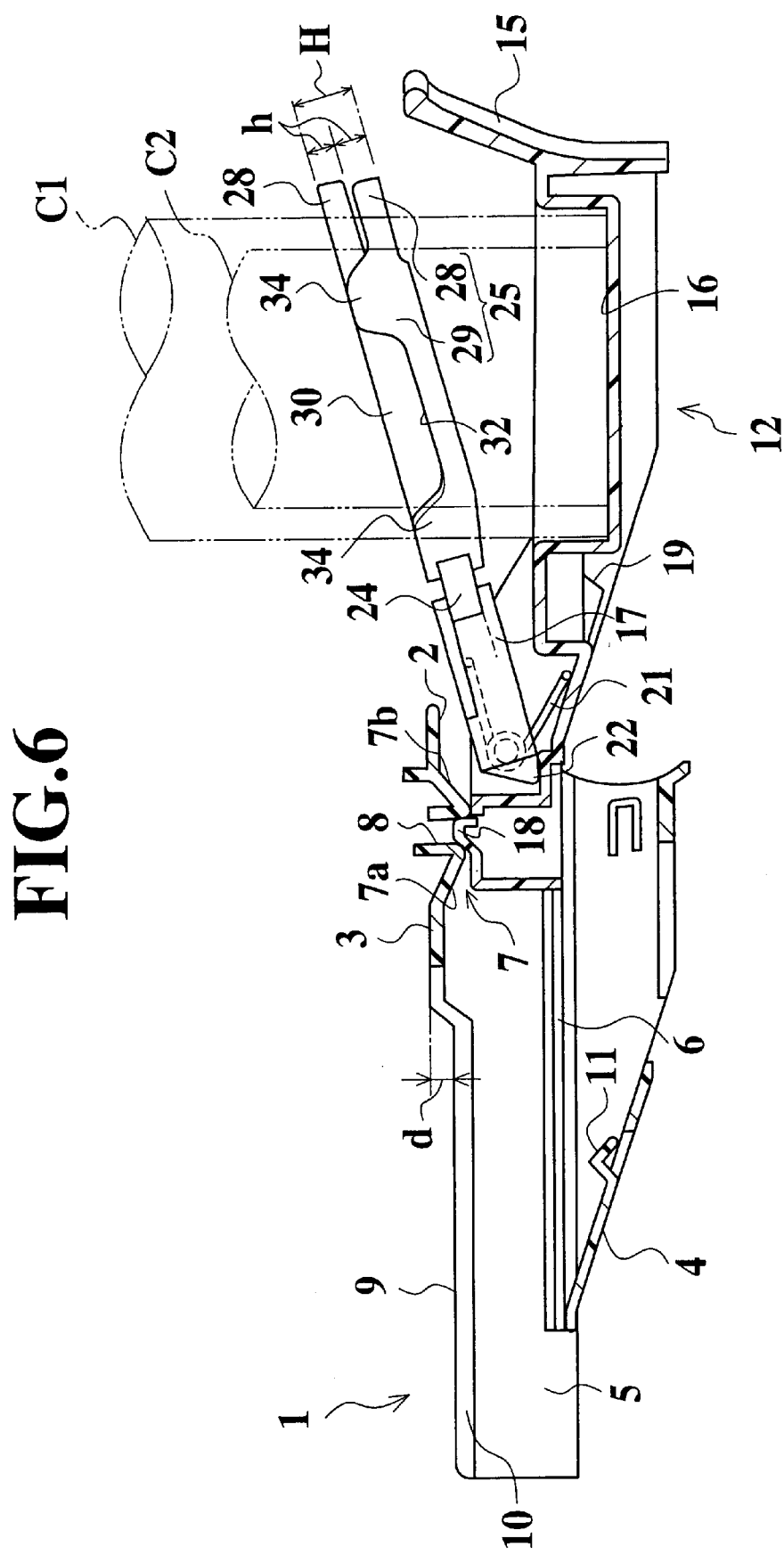
FIG. 6 is a cross-section view in the direction indicated by the arrows VI—VI in FIG. 5.

Preferred embodiments of the present invention are described below, with reference being made to FIG. 1 to FIG. 10. In the drawings, the reference numeral 50 denotes the front side, and the reference numeral 51 denotes the rear side.

A case 1, for a rear-seat passenger, is provided at the rear surface of a console box (not shown in the drawing) that is installed between the left and right front seats (not shown in the drawing) of a vehicle. The case 1 has a substantially rectangular tubular shape, an upper surface 3, a lower surface 4, right and left sides 5, and an aperture 2 that opens toward the passenger compartment at the rear end. On the inside of each of the sides 5 is provided a guide groove 6, which extends front-to-rear. This groove 6 being formed by two ribs.

At the rear center of the upper surface 3, is formed a downward-facing protrusion 7, onto the front and back of which are formed inclined surfaces 7a and 7b. On the lower edge of the protrusion 7 is formed a lock hole 8. The region 9 of the upper surface 3 more farther forward than the protrusion 7 is formed so as to be lower than protrusion 7 by d (refer to FIG. 7). In the center part of the region 9 is formed a cutout 10, along the directions toward the front and rear. The lower surface 4 of the case 1 is inclined upward toward the front. The center part of the lower surface 4 has formed on it a resilient tab 11, which faces upward.

A tray 12 is provided so that it can be pulled out from a position in which it is stored in the case 1 to a position in which it is used, on the aperture 2 side of the case 1. Left and right flanges 13 are provided on the front side of the tray 12, and a guide rib 14 is formed on the outside of surface of the flanges 13, running front-to-rear. By inserting the guide ribs 14 into the guide grooves 6 of the case 1, the tray 12 is movably supported within the case 1. A lid 15, which covers over the aperture 2 when the tray 12 is in the stored position, is provided at the rear end of the tray 12. On both the left and right sides at the front of the tray 12 are formed depressions 16, which are substantially semicircular in shape, and which support the bottom surface of the container to be supported.

On the front end of the tray 12 is formed a lock tab 18, which protrudes upward from the base 17, to be described below. This lock tab 18 engages with the lock hole 8, so as to hold the case 1 In the usage position. In this embodiment in particular, because the lock hole 8 is formed on the lower end of the raised protrusion 7, the area surrounding the lock hole 8 has good rigidity, thereby improving the engagement force between the lock hole 8 and the lock tab 18.

When the tray 12 is first inserted into the aperture 2 of the case 1, because the rear inclined surface 7b serves as a guide surface, the task of inserting the tray 12 into the aperture 2 is facilitated. When the tray 12 is pulled out, because the front inclined surface 7a of the protrusion serves as a guide surface, the lock tab 18 engages securely with the lock hole 8.

On the lower surface of the tray 12 is formed a downwardly facing protruding piece 19, which engages with the resilient tab 11 formed on the lower surface 4 of the case 1.

The base 17 is provided between the left and right flanges 13 of the tray 12, and is substantially a rectangularly shaped tube, with an aperture at the rear end. The front end of the base 17 is supported via a hinge 20, so as to freely rotate with respect to the flanges 13. A spring 21 is provided as an impelling member at the inside front end of the base 17. One end of the spring 21 exits the base 17 via a cutout (not shown in the drawing) and makes contact with the upper surface of the tray 12, and the other end of the spring 21 makes contact with the upper surface of the base 17 from the bottom. By means of the spring 21, the rear part of the base 17 is lifted upward, about the hinge 20 as a center, so as to impart an inclination to the base 17. The front end of the base 17 has formed on its left and right a pair of stoppers 22. These stoppers 22 come into contact with the upper surface of the tray 12, and support the upward inclination angle of the base 17 so as to fix the base 17 at this angle.

The holder 23 has a pair of left and right arms, which have a ring 25. Each of the rings 25 is formed at the front end of the arm, and supports a container from the side. When inserted into the base 17, each arm 24 is supported about a hinge 26 so as to be able to freely rotate with respect to the base 17. Each ring 25 includes an overlapping part 28, which overlaps vertically with an overlapping part 28 of the other ring 25 when the arms 24 are brought into mutual proximity, and a non-overlapping part 29 which does not overlap with the corresponding part of the other ring 25 when the arms 24 are brought into mutual proximity. When the tray 12 is pushed into the storage position of the case 1, because the mutual overlapping of the overlapping parts 28, the case 1 is made compact in the left-to-right direction. When the tray 12 is pulled out to the usage position, by means of a spring 27 disposed between the arms 24, the holders 23 mutually open up to the right and left, so that they are distanced from one another. When containers C1 and C2 are inserted into the rings 25 from the top, the rings 25 support the sides of the containers C1 and C2, and the depression 16 in the tray 12 supports the bottom surfaces of the containers C1 and C2.

In this embodiment of the present invention in particular, by pulling the tray 12 out from the case 1, the holders 23 are inclined upward, along with the base 17. For this reason, because the holders 23 support the sides of the containers C1 and C2 at a high position, containers C1 and C2 are supported more securely. Because the springs 21 and 27 are both disposed within the base 17 and are not exposed to the outside, the appearance is also improved.

The vertical dimension h of the overlapping parts 28 of the rings 25 is set so as to be just one-half of the vertical dimension H of the non-overlapping parts 29. Therefore, even if there is vertical overlapping of the rings 25, the vertical dimension thereof is smaller than the sum of the vertical dimension of the two rings 25 (non-overlapping parts 29). For this reason, the vertical dimension of case 1 is smaller, making the holder suitable for use in a vehicle in which there is only limited usable space.

Figure 7:
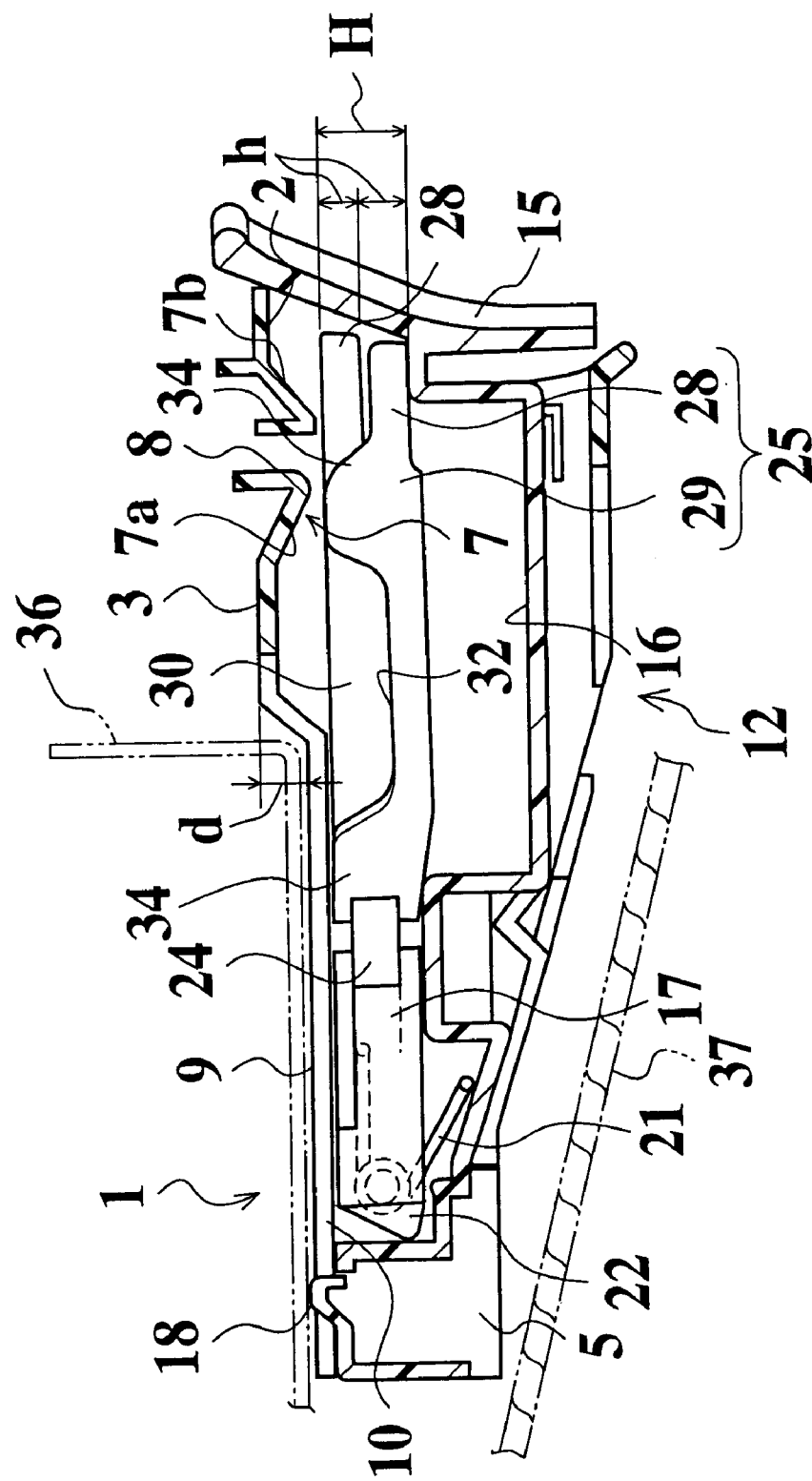
FIG. 7 is a cross-section view showing the tray in the stored condition.
Figure 8:
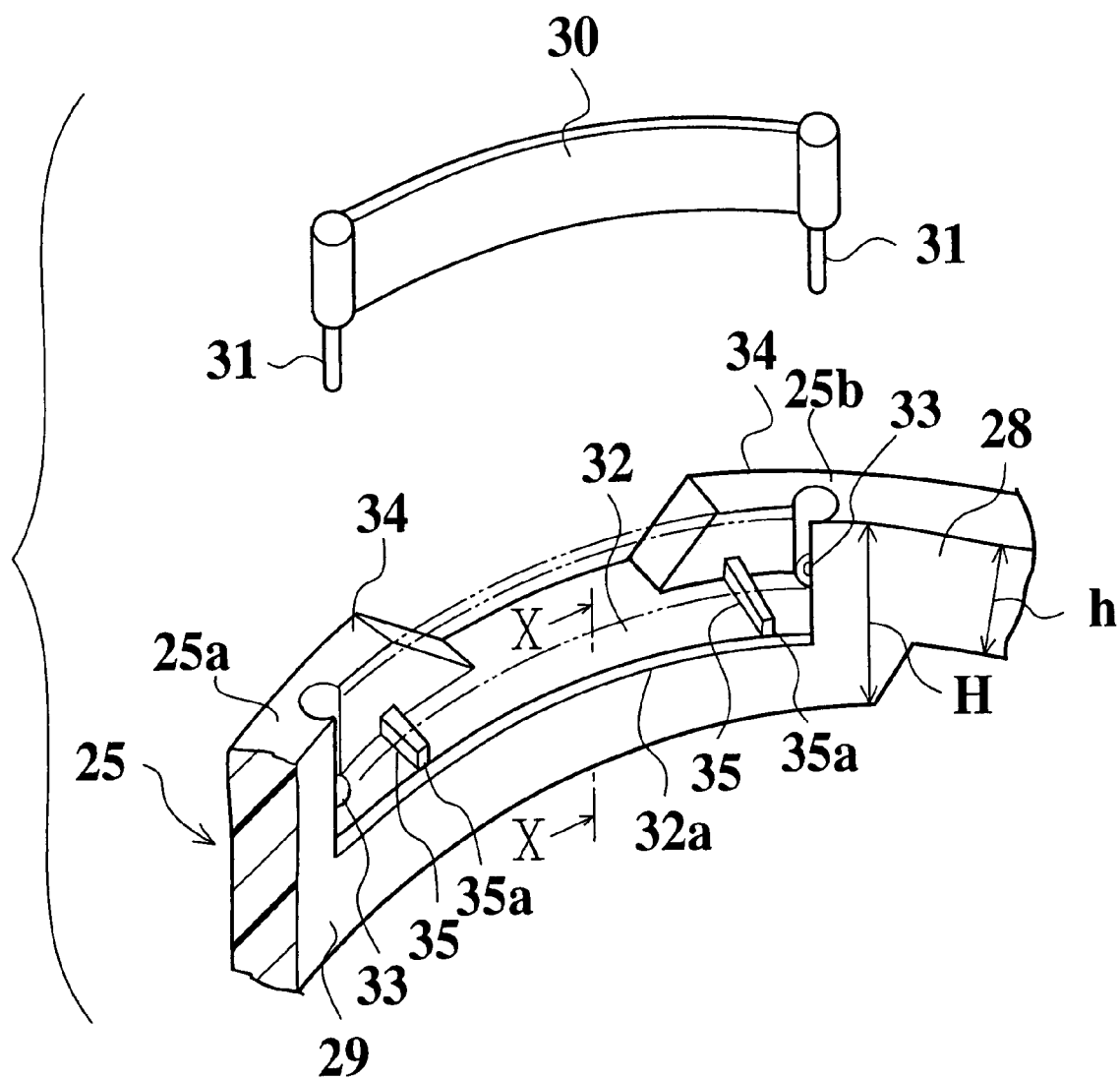
FIG. 8 Is an enlarged perspective view showing the structure in the area around the ring cutout.

The upper surface of the base 17 and the upper surface of the rings 25 are formed substantially on the same plane (refer to FIG. 7). Therefore, jamming of the base 17 and the holder 23 inside the case 1 is prevented, and it is possible to move the base 17 and the holder 23 forward and back within the case 1. In this embodiment in particular, because the vertical dimension h of the overlapping parts 28 of the rings 25 is one-half that of the non-overlapping parts 29, when the rings mutually overlap, the overall vertical dimension of the holders 23 is approximately the same as one of the non-overlapping parts 29, so that the upper surfaces of one overlapping part 28 and the other non-overlapping part 29 are approximately on the same plane, this also acting to prevent jamming of the holder 23 inside the case 1.

The non-overlapping part 29 is provided with a spring sheet 30 made of a synthetic resin. The lower end part of this spring sheet 30 has a downward-facing pin 31 formed on it. On a part of the non-overlapping part 29 corresponding to the spring sheet 30 is formed a cutout 32 of a prescribed length, from the top thereof. On both ends of the bottom of this cutout 32, are formed a hole 33, into which is inserted pins 31 on both ends of the spring sheet 30. By inserting the pin 31 into the hole 33, the spring sheet 30 is supported in a condition in which it is curved along the non-overlapping part 29, thereby forming part of the inner surface of the ring 25. The inner surface of the spring plate 30, along with the other inner surface supports the side of the container C1, which has a large diameter corresponding to the ring 25 (refer to FIG. 6). The spring sheet 30 is pressed inward by the finger so that it is inverted inward, which condition it supports the side of the container C2, which has a small diameter. In this embodiment of the present invention, the condition in which the spring sheet 30 curved along the non-overlapping part 29 will be referred to as the "curved condition," and the condition in which the spring sheet 30 is curved inward will be referred to as the "inverted condition."

The ring 25 has formed as one with it a wall (extension) 34 that makes contact with and supports both ends of the spring plate from the side. This wall 34 extends from the walls 25a and 25b that are adjacent to the cutout 32, toward the inside of the cutout 32. Because this wall 34 supports the end of the spring sheet 30 from the outside, the holding force of the spring sheet 30 with respect to the large-diameter container C1 is increased. The wall 34 can be used as a guide when mounting the spring sheet 30 to the ring 25. By forming the wall 34 in proximity to the hole 33, the area surrounding the hole 33 is strengthened by the wall 34, thereby preventing a loss of strength of the ring 25 because of the formation of the hole 33.

In proximity to the two ends of the bottom surface of the cutout 32 are formed ribs 35, which have a very small height e (refer to FIG. 10), along the radial direction of the ring 25. An inside corner of this rib 35 is formed chamfers 35a, and the outside end is linked with the wall 34. Because the outer end part of the rib 35 is linked to the wall 34, it is possible for the rib 35 to reinforce the wall 34. A chamfer 32a is also formed on an inside corner part of the cutout 32.

Figure 10:
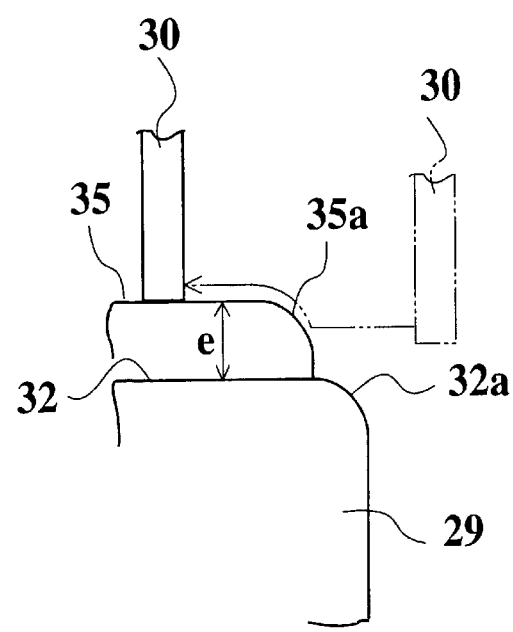
FIG. 10 is a cross-section view in the direction indicated by the arrows X—X in FIG. 8.

Because of the formation of ribs 35 on the bottom surface of the cutout 32, as shown in FIG. 10, the contact surface area between the lower end of the spring sheet 30 and the ring 25 is made small, so that jamming is prevented when the spring sheet 30 is returned from the inverted condition to the curved condition. When the spring sheet 30 is returned to the curved condition, the ends thereof have more returning force, to the extent that the distance moved is shorter, than the center part. In this embodiment, therefore, by forming ribs 35 in the regions of the ends of the spring sheet 30, when returned from the curved condition, the spring sheet 30 rises surely over the rib 35, thereby preventing jamming. Furthermore, because of the formation of a chamfer 35a on the inside corner part of the rib 35, there is further prevention of jamming when the spring sheet 30 is returned to the curved condition. Additionally, because of the formation of a chamfer 32a on the inside corner part of the lower surface of the cutout 32 as well, even if the center part of the spring sheet 30 flexes downward when returned to the curved condition, there is no catching on the inside corner part of the lower surface of the ring 25.

When the rings 25 are overlapped, one of the spring sheets 30 that has been placed in the inverted condition is returned to the curved condition by being pressed outward by the overlapping part 28 of the other ring 25. When this occurs, the overlapping part 28 of the other ring 25 presses the point 53 offset from the center 52 of the spring sheet 30.

Because the spring sheet 30, which was in the inverted condition, is returned automatically to the original condition by being pressed by the other ring 25, it is not necessary to actually return the spring sheet 30 by hand, thereby providing an additional convenience. That is, because when storing the base 17, the spring sheet 30 that had been in the inverted condition, is automatically returned to the curved condition, when the base 17 is pulled out, the spring sheet 30 is already ready for use in the curved condition.

Figure 9:
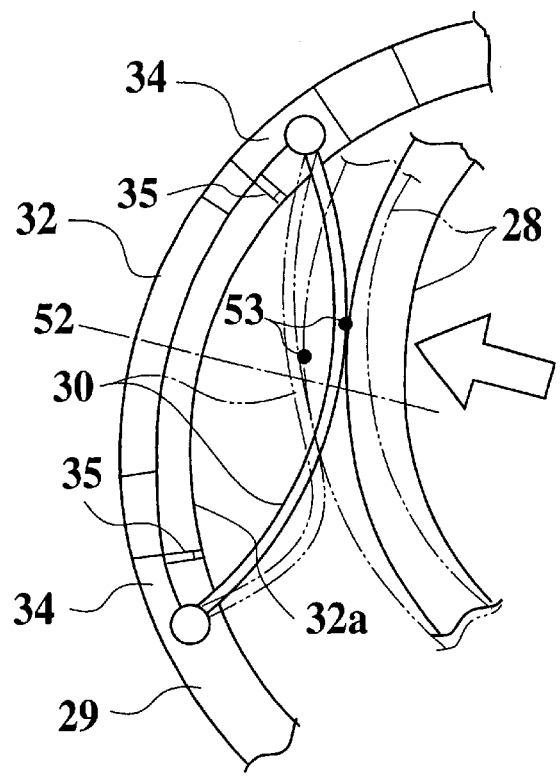
FIG. 9 is an enlarged perspective view showing the structure in the area around the ring cutout.

Rather than returning the spring sheet 30 from the inverted condition at once with a sharp force, the point 53, which is offset from the center 52 is pressed, thereby returning the spring sheet 30 to the original condition, as it changes to an S-shape (refer to FIG. 9). Therefore, the force of pressure of the other ring 25 is small, and the sound generated when the spring sheet 30 is returned is small. In order to achieve this type of function, the height of the overlapping part 28 of one of the rings 25 such that it makes contact with the spring sheet 30 in the inverted condition of the other ring 25 when the rings 25 overlap.

Although the above-noted embodiment of the present invention was described for the case in which a cutout 32 is formed in the ring 25 from the top surface and a spring sheet 30 is provided at the cutout 32, it is also possible to form the cutout 32 from the upper surface of the ring 25 of one holder, provide a spring sheet 30 on that cutout 32, invert this holder and use it as the other holder. In this case, because the spring sheet 30 of the other holder is mounted below the lower surface of the cutout 32, when the holder is installed in a low position, it is difficult to return the spring sheet 30 from the curved condition to the inverted condition. However, because one holder can be used as either the left or the right holder, manufacturing tooling such as dies forming the holders are halved, thereby reducing the manufacturing cost.

As noted earlier, because the front-side region 9 is formed so as to be lower than the protrusion 7 (refer to FIG. 7), it is possible to establish a large amount of space adjacent to and above the case 1 for items such as an internal box 36 for a console box. Also, even if the front-side region 9 is lowered in this manner, because of the formation of the cutout 10 for the purpose of avoiding interference between the upper surface 3 and the lock tab 18, smooth movement of the tray 12 within the case 1 is maintained. Additionally, because of the gradually upward inclination of the lower surface 4 of the case 1 toward the front side it is possible to establish a large amount of space for items such as a parking brake cable 3 installed adjacent to and below the case 1.

What is claimed is:

1. A cup holder for a vehicle comprising:

a case adapted to be fixed within a vehicle, the case having an aperture open to a passenger compartment;

a tray for supporting a bottom of a container, the tray being movably supported by the case, and capable of being pulled out from a storage position within the case to a usage position via the aperture; and left and right holders, each holder having an arm, each of said arms having a ring for supporting a respective container from a side thereof, each said arm being linked to the tray so as to be freely rotatable in the horizontal direction, each said ring having an overlapping part which overlaps vertically with the other overlapping part and a non-overlapping part which does not overlap with the other ring when the arms are brought into mutual proximity, and the vertical direction width of the overlapping part being smaller than the vertical direction width of the non-overlapping part, wherein the width of each said overlapping part is substantially one-half that of each said non-overlapping part, wherein each said non-overlapping part comprises a cutout formed from an upper edge thereof and a spring sheet associated with said cutout, wherein each said spring sheet is changeable from a curved condition along the non-overlapping part to an inverted condition bent toward an inside of the ring, and wherein each said spring sheet in the curved condition is disposed within the cutout so as to reside on the non-overlapping part of the associated ring in the vertical direction.

2. The cup holder according to claim 1, wherein both ends of the spring sheet are supported by the non-overlapping part.

3. The cup holder according to claim 1, wherein when the spring sheet of one of the holders is in the inverted condition and as the arms approach each other, the overlapping part of the other holder pushes the spring sheet of the one holder toward an outside, so as to return it to the curved condition.

4. The cup holder according to claim 1, wherein the overlapping part of the other holder pushes a point that is offset from a center of the one spring sheet.

5. A cup holder for a vehicle comprising:

a ring for supporting a container from a side thereof, the ring having a cutout formed from a top edge thereof; and a spring sheet being changeable from a curved condition along the ring to an inverted condition bent toward an inside of the ring, the spring sheet in the curved condition being disposed within the cutout so as to reside on the ring in a vertical direction, both sides of the spring sheet being rotatably supported by the ring, and the ring having an extended part that makes contact with an outer surface of the spring sheet in the curved condition, wherein each side of the spring sheet has a pin that protrudes downward therefrom, the pin being inserted in a corresponding hole in a bottom of the cutout, and wherein the bottom of the cutout has a rib extending substantially in a radial direction of the ring.

6. A cup holder for a vehicle comprising:

a ring for supporting a container from a side thereof, the ring having a cutout formed from a top edge thereof; and a spring sheet being changeable from a curved condition along the ring to an inverted condition bent toward an inside of the ring, the spring sheet in the curved condition being disposed within the cutout so as to reside on the ring in a vertical direction, both sides of the spring sheet being rotatably supported by the ring, and the ring having an extended part that makes contact with an outer surface of the spring sheet in the curved condition, wherein each side of the spring sheet has a pin that protrudes downward therefrom, the pin being inserted in a corresponding hole in a bottom of the cutout, and wherein the bottom of the cutout has ribs extending substantially in a radial direction of the ring, the ribs being disposed in proximity to the ends of the spring sheet.

7. A cup holder according to claim 6, wherein an upper corner of each of the ribs is chamfered.

8. A cup holder according to claim 7, wherein an outside edge of each the rib is continuous with the extended part.

9. A cup holder for a vehicle comprising:

a ring for supporting a container from a side thereof, the ring having a cutout formed from a top edge thereof; and a spring sheet being changeable from a curved condition along the ring to an inverted condition bent toward an inside of the ring, the spring sheet in the curved condition being disposed within the cutout so as to reside on the ring in a vertical direction, both sides of the spring sheet being rotatably supported by the ring, and the ring having an extended part that makes contact with an outer surface of the spring sheet in the curved condition, wherein a bottom of the cutout has a rib extending substantially in a radial direction of the ring.

10. A cup holder for a vehicle comprising:

a ring for supporting a container from a side thereof, the ring having a cutout formed from a top edge thereof; and a spring sheet being changeable from a curved condition along the ring to an inverted condition bent toward an inside of the ring, the spring sheet in the curved condition being disposed within the cutout so as to reside on the ring in a vertical direction, both sides of the spring sheet being rotatably supported by the ring, and the ring having an extended part that makes contact with an outer surface of the spring sheet in the curved condition, wherein a bottom of the cutout has ribs extending substantially in a radial direction of the ring, the ribs being disposed in proximity to the ends of the spring sheet.

11. A cup holder according to claim 10, wherein an upper corner of each rib is chamfered.

12. A cup holder according to claim 11, wherein an outside edge of each rib is linked to the extended part.

* * * * *